United States Patent
Pataut et al.

(10) Patent No.: US 12,202,966 B2
(45) Date of Patent: Jan. 21, 2025

(54) RESIN COMPOSITION COMPRISING A SPECIFIC CROSSLINKING AGENT

(71) Applicant: COMPAGNIE GENERALE DES ETABLISSEMENTS MICHELIN, Clermont-Ferrand (FR)

(72) Inventors: Gael Pataut, Clermont-Ferrand (FR); David Doisneau, Clermont-Ferrand (FR); Laura Luiz, Clermont-Ferrand (FR); Julien Letessier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 365 days.

(21) Appl. No.: 17/414,822

(22) PCT Filed: Dec. 17, 2019

(86) PCT No.: PCT/FR2019/053104
§ 371 (c)(1),
(2) Date: Jun. 16, 2021

(87) PCT Pub. No.: WO2020/128288
PCT Pub. Date: Jun. 25, 2020

(65) Prior Publication Data
US 2022/0064434 A1    Mar. 3, 2022

(30) Foreign Application Priority Data

Dec. 18, 2018  (FR) ......................... 1873134
Jan. 31, 2019  (FR) ......................... 1900922

(51) Int. Cl.
| | |
|---|---|
| B60C 1/00 | (2006.01) |
| C08J 5/24 | (2006.01) |
| C08K 5/14 | (2006.01) |
| C08K 5/18 | (2006.01) |
| C08K 5/23 | (2006.01) |
| C08K 5/3477 | (2006.01) |
| C08K 7/02 | (2006.01) |
| C08L 63/04 | (2006.01) |
| C08L 63/10 | (2006.01) |
| C08L 67/06 | (2006.01) |
| C08L 67/07 | (2006.01) |

(52) U.S. Cl.
CPC .............. *C08L 63/10* (2013.01); *B60C 1/00* (2013.01); *C08K 5/14* (2013.01); *C08K 5/18* (2013.01); *C08K 5/23* (2013.01); *C08K 5/3477* (2013.01); *C08K 7/02* (2013.01); *C08L 63/04* (2013.01); *C08L 67/06* (2013.01); *C08L 2312/06* (2013.01)

(58) Field of Classification Search
None
See application file for complete search history.

(56) References Cited

U.S. PATENT DOCUMENTS

| | | | |
|---|---|---|---|
| 3,808,226 A * | 4/1974 | Habermeier et al. .. | C08G 59/14 544/221 |
| 4,107,128 A * | 8/1978 | Hosoi ..................... | C04B 26/04 428/367 |
| 6,640,859 B1 | 11/2003 | Laurent et al. | |
| 6,875,297 B1 | 4/2005 | Meuwly et al. | |
| 6,926,853 B2 | 8/2005 | Hinc et al. | |
| 6,994,135 B2 | 2/2006 | Delfino et al. | |
| 7,032,634 B2 | 4/2006 | Laurent et al. | |
| 7,032,637 B2 | 4/2006 | Meraldi | |
| 7,201,194 B2 | 4/2007 | Rhyne et al. | |
| 7,484,949 B2 | 2/2009 | Hinc et al. | |
| 8,277,590 B2 | 10/2012 | Delfino et al. | |
| 8,517,068 B2 | 8/2013 | Delfino et al. | |
| 8,585,942 B2 | 11/2013 | Meraldi et al. | |

(Continued)

FOREIGN PATENT DOCUMENTS

| | | | | |
|---|---|---|---|---|
| EP | 167304 A | * | 1/1986 | ............. C08G 73/12 |
| EP | 1074369 A1 | | 2/2001 | |

(Continued)

OTHER PUBLICATIONS

Dehghan et al.: "The ultrasonic-assisted synthesis of tetrafunctional acrylated epoxy clay nanocomposite"; Polymer Bulletin (Heidelberg, Germany) (2019), 76(10), 5197-5211 CODEN: POBUDR; ISSN: 0170-0839 (Year: 2019).*

(Continued)

*Primary Examiner* — Michael J Feely
(74) *Attorney, Agent, or Firm* — VENABLE LLP

(57) ABSTRACT

A resin composition is based on a resin selected from the group consisting of vinyl ester resins and unsaturated polyester resins, a crosslinking initiator and a crosslinking agent of general formula (I)

$$\left( X \!-\!\!\underset{OH}{\overset{}{\diagdown\!\!\diagup}}\!\!-\!\! R \right)_i \quad (I)$$

in which i is an integer between 2 and 4, X is an i-valent group comprising at least one ring of 6 atoms selected from carbon and nitrogen and comprising at least 2 heteroatoms selected from nitrogen and oxygen, and R is an acrylate group, methacrylate group, vinyl group, alkenyl group bearing an unsaturated carbon at the chain end, or alkynyl group bearing an unsaturated carbon at the chain end.

11 Claims, 1 Drawing Sheet

(56) References Cited

U.S. PATENT DOCUMENTS

| | | |
|---|---|---|
| 8,962,120 B2 | 2/2015 | Delfino et al. |
| 9,840,644 B2 | 12/2017 | Doisneau et al. |
| 10,005,929 B2 | 6/2018 | Doisneau et al. |
| 10,040,976 B2 | 8/2018 | Doisneau et al. |
| 10,208,157 B2 | 2/2019 | Feng et al. |
| 10,767,086 B2 | 9/2020 | Doisneau et al. |
| 2002/0043319 A1 | 4/2002 | Meraldi |
| 2003/0015827 A1 | 1/2003 | Hinc et al. |
| 2003/0213541 A1 | 11/2003 | Laurent et al. |
| 2003/0226630 A1 | 12/2003 | Delfino et al. |
| 2005/0173823 A1 | 8/2005 | Hinc et al. |
| 2009/0022921 A1 | 1/2009 | Meraldi et al. |
| 2010/0181006 A1 | 7/2010 | Delfino et al. |
| 2010/0307653 A1 | 12/2010 | Delfino et al. |
| 2011/0260525 A1 | 10/2011 | Delfino et al. |
| 2013/0233458 A1 | 9/2013 | Meraldi et al. |
| 2014/0235124 A1 | 8/2014 | Doisneau et al. |
| 2014/0235125 A1 | 8/2014 | Doisneau et al. |
| 2014/0308864 A1 | 10/2014 | Doisneau et al. |
| 2017/0050468 A1* | 2/2017 | Delfino .................. D02G 3/18 |
| 2017/0253690 A1 | 9/2017 | Feng et al. |
| 2018/0009264 A1 | 1/2018 | Delfino |
| 2018/0118983 A1 | 5/2018 | Doisneau et al. |
| 2021/0156079 A1* | 5/2021 | Sakaguchi ............ D06M 15/55 |
| 2022/0064342 A1 | 3/2022 | Pataut et al. |

FOREIGN PATENT DOCUMENTS

| | | |
|---|---|---|
| EP | 1242254 A0 | 6/2001 |
| EP | 1167080 A1 | 1/2002 |
| EP | 1174250 A1 | 1/2002 |
| EP | 1359028 A1 | 11/2003 |
| EP | 3191547 A1 | 7/2017 |
| FR | 3031757 A1 | 7/2016 |
| JP | 2011-175724 A | 9/2011 |
| WO | 00/37269 A1 | 6/2000 |
| WO | 2007/085414 A1 | 8/2007 |
| WO | 2008/080535 A1 | 7/2008 |
| WO | 2009/033620 A1 | 3/2009 |
| WO | 2009/135561 A2 | 11/2009 |
| WO | 2012/032000 A1 | 3/2012 |
| WO | 2012/115615 A1 | 8/2012 |
| WO | 2013/017421 A1 | 2/2013 |
| WO | 2013/017422 A1 | 2/2013 |
| WO | 2013/017423 A1 | 2/2013 |

OTHER PUBLICATIONS

International Search Report dated Mar. 31, 2020, in corresponding PCT/FR2019/053104 (5 pages).

X. Tao, et al. "Synthesis of an acrylate constructed by phosphaphenanthrene and triazine-trione and its application in intrinsic flame retardant vinyl ester resin", Polymer Degradation and Stability, vol. 154, pp. 285-294 (2018).

* cited by examiner

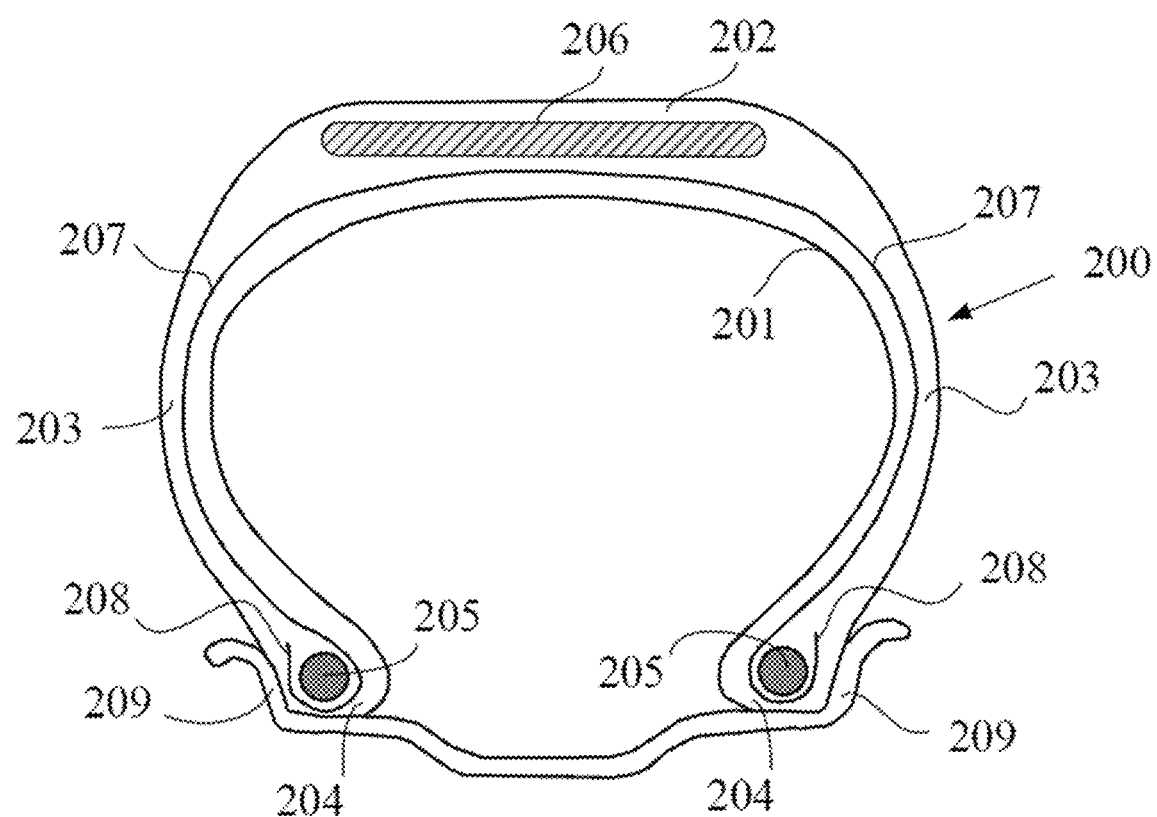

RESIN COMPOSITION COMPRISING A SPECIFIC CROSSLINKING AGENT

TECHNICAL FIELD OF THE INVENTION

The present invention relates to the field of resin compositions and to composites, which can be used in particular for reinforcing semi-finished products or finished articles such as vehicle tyres, of pneumatic or non-pneumatic type.

PRIOR ART

Tyre designers have long sought low density textile or composite type "reinforcers" (elongate reinforcing elements) which could advantageously and effectively replace the conventional metal threads or cords, with a view to reducing especially the weight of these tyres and also to remedying any problems of corrosion.

Thus, patent EP 1 167 080 (or U.S. Pat. No. 7,032,637) has already described a composite reinforcer based on monofilaments of glass-resin composite (abbreviated to GRC) type with high mechanical properties, comprising continuous unidirectional glass fibres, impregnated in a crosslinked resin of vinyl ester type. As well as a high compressive breaking stress which is greater than its tensile breaking stress, this GRC monofilament has an elongation at break of the order of 3.0% to 3.5%.

Document FR 3 031 757 for its part describes a multi-composite reinforcer comprising one or more GRC monofilaments having improved mechanical properties, with an elongation at break of greater than 4%. This document describes the use of an epoxy vinyl ester resin composition, also comprising a phosphine-type photoinitiator and a crosslinking agent, tris(2-hydroxyethyl)isocyanurate triacrylate.

By virtue of the above properties, these documents have shown that it was possible to replace steel cords with such GRC monofilaments, positioned in particular under the tread in parallel sections, as novel reinforcing elements for pneumatic tyre belts, thereby making it possible to significantly lighten the structure of the tyres.

Experience has shown, nonetheless, that the GRC monofilaments described in the above patents can be further improved, in particular for their use in vehicle tyres.

Now, continuing their research, the Applicant has discovered that the use of particular crosslinking agents makes it possible to further improve the elongation at break and the flexural modulus of the resin compositions, giving the composites comprising such compositions properties that are notably improved compared to those of the composites of the prior art.

SUMMARY

Without this being limiting, the subject of the invention is at least one of the following embodiments:
1. Resin composition based on:
   a resin selected from the group consisting of vinyl ester resins and unsaturated polyester resins,
   a crosslinking initiator and
   a crosslinking agent of general formula (I)

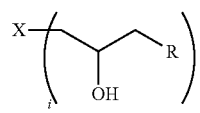

(I)

in which:
   i is an integer between 2 and 4;
   X is an i-valent group comprising at least one ring of 6 atoms selected from carbon and nitrogen and comprising at least 2 heteroatoms selected from nitrogen and oxygen;
   R is an acrylate group, methacrylate group, vinyl group, alkenyl group bearing an unsaturated carbon at the chain end, or alkynyl group bearing an unsaturated carbon at the chain end.
2. Composition according to embodiment 1, in which the resin is selected from the group consisting of vinyl ester resins.
3. Composition according to the preceding embodiment, in which the resin is an epoxy vinyl ester resin based on novolac, bisphenol, or novolac and bisphenol.
4. Composition according to any one of the preceding embodiments, in which the i groups are each bonded to the X group through a heteroatom of said X group.
5. Composition according to any one of the preceding embodiments, in which the X group comprises at least one aromatic ring.
6. Composition according to the preceding embodiment, in which the X group is an i-valent group having as formula one of the formulae (II) to (IV) below:

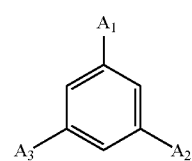

(II)

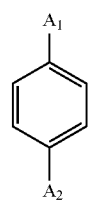

(III)

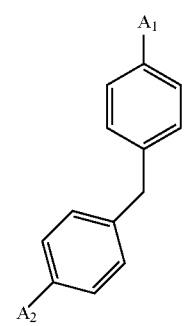

(IV)

in which the $A_1$, $A_2$ and $A_3$ groups each represent, independently of one another, an at least divalent group comprising a heteroatom selected from oxygen and nitrogen.
7. Composition according to the preceding embodiment, in which A represents a heteroatom selected from oxygen and nitrogen.
8. Composition according to one of embodiments 1 to 4, in which the X group is a trivalent group of formula (V):

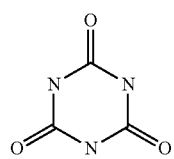

(V)

9. Composition according to any one of the preceding embodiments, in which R is an acrylate, methacrylate, vinyl, allyl or ethynyl group, preferentially an acrylate, methacrylate or vinyl group, and very preferentially an acrylate or methacrylate group.

10. Composition according to any one of the preceding embodiments, in which the crosslinking initiator is a radical initiator selected from halogenated compounds, compounds comprising an azo group, and peroxide compounds.

11. Composition according to the preceding embodiment, in which the crosslinking initiator is selected from azobisisobutyronitrile and peroxides, preferentially selected from azobisisobutyronitrile and benzoyl peroxide.

12. Composition according to any one of embodiments 1 to 9, in which the crosslinking initiator is a photoinitiator sensitive to UV above 300 nm, preferably between 300 and 450 nm.

13. Composition according to the preceding embodiment, in which the crosslinking initiator is selected from the group of phosphine compounds, alpha-hydroxy ketone compounds, benzophenone compounds, thioxanthone derivatives and a mixture thereof.

14. Composition according to the preceding embodiment, in which the phosphine compounds are selected from the group consisting of bis(acyl)phosphine oxides and mono(acyl)phosphine oxides.

15. Composition according to embodiment 13, in which the alpha-hydroxy ketone compounds are selected from the group consisting of dimethylhydroxy acetophenone and 1-hydroxycyclohexyl phenyl ketone.

16. Composition according to embodiment 13, in which the benzophenone compounds are 2,4,6-trimethylbenzophenone.

17. Composition according to embodiment 13, in which the thioxanthone derivatives are isopropylthioxanthone.

18. Composition according to any one of embodiments 1 to 17, comprising from 0.5% to 3% by weight of crosslinking initiator.

19. Composition according to any one of embodiments 1 to 18, comprising from 2% to 15% by weight, preferably from 5% to 10% by weight, of crosslinking agent of general formula (I).

20. Compound of formula (VI) or (VII):

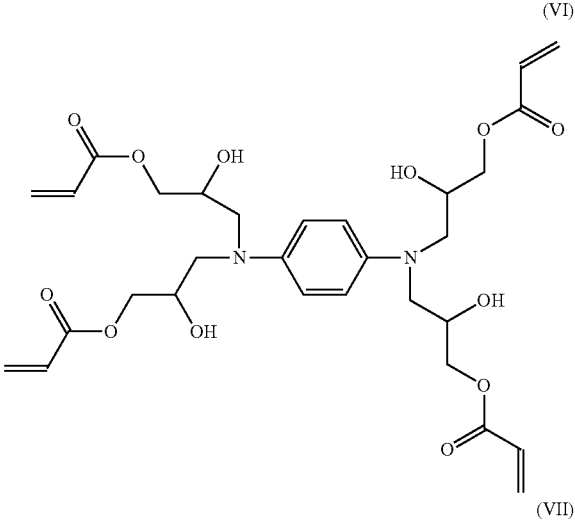

(VI)

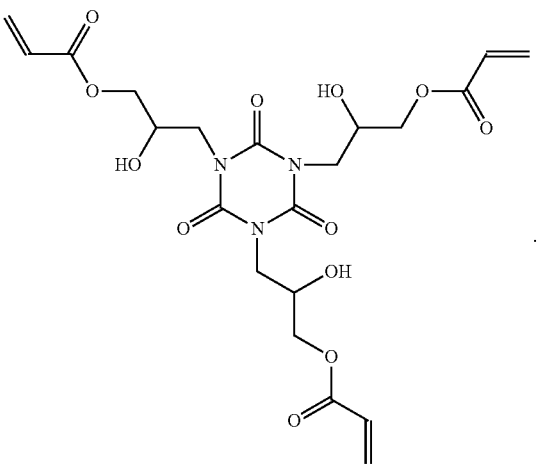

(VII)

21. Composite comprising a composition according to any one of the embodiments 1 to 19 or a compound according to embodiment 20, and at least one fibre.

22. Composite according to the preceding embodiment, in which said fibre is made of a material selected from organic and inorganic materials.

23. Composite according to either one of embodiments 21 and 22, in which said fibre is made of a material selected from aliphatic polyamides, polyesters, aromatic polyamides, natural cellulose, rayon, glass, quartz, basalt, carbon, and a metal selected from the group consisting of steel, copper, zinc, brass and alloys of these metals.

24. Finished or semi-finished article comprising a composition according to any one of embodiments 1 to 19 or a crosslinking agent according to embodiment 20.

25. Finished or semi-finished article comprising a composition according to any one of embodiments 1 to 19, a compound according to embodiment 20, or a composite according to any one of embodiments 21 to 23 coated with a rubber composition matrix.

26. Tyre comprising a composition according to any one of embodiments 1 to 19, a compound according to embodiment 20, or a composite according to any one of embodiments 21 to 23 or a finished or semi-finished article according either one of embodiments 24 and 25.

These embodiments, and also other particular arrangements, are disclosed in greater detail below.

BRIEF DESCRIPTION OF THE DRAWINGS

FIG. 1 illustrates, highly schematically (without being true to a specific scale) a radial section through a pneumatic tyre, that is or is not in accordance with the invention in this general representation.

DETAILED DESCRIPTION

Definitions

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

In the present document, unless expressly indicated otherwise, all the percentages (%) indicated are percentages (%) by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The compounds comprising carbon mentioned in the description may be of fossil or biobased origin. In the latter case, they may be partially or completely derived from biomass or be obtained from renewable starting materials derived from biomass. They are in particular polymers, plasticizers, fillers, etc.

The term "molar equivalent", which is well known to those skilled in the art, should be understood as meaning the quotient between the number of moles of the compound or function concerned and the number of moles of the reference compound or function. Thus, 2 molar equivalents of the compound or function B relative to the compound or the function A represent 2 mol of the compound or function B when 1 mol of the compound or function A is used.

Resin

The resin composition according to the invention comprises a resin selected from the group consisting of vinyl ester resins and unsaturated polyester resins.

The resin composition according to the invention can be crosslinked (for example photocured and/or thermoset), i.e. in the form of a network of three-dimensional bonds, or else noncrosslinked.

The resin used is, by definition, a crosslinkable (i.e. curable) resin which is capable of being crosslinked or cured by any known method, in particular by a heat treatment or by UV (or UV-visible) radiation, preferably emitting in a spectrum ranging at least from 300 nm to 450 nm.

As crosslinkable resin, use is preferably made of a polyester or vinyl ester resin, more preferentially a vinyl ester resin. "Polyester" resin is understood to mean, in a known way, a resin of the unsaturated polyester type. Vinyl ester resins are well known in the field of composite materials.

The vinyl ester resin is preferentially of epoxy vinyl ester type. Use is more preferentially made of a vinyl ester resin, in particular of the epoxide type, which, at least in part, is based on novolac and/or bisphenol (that is to say, grafted to a structure of this type), i.e. preferentially a vinyl ester resin based on novolac, bisphenol, or novolac and bisphenol.

An epoxy vinyl ester resin based on novolac corresponds for example, in a known manner, to formula (R1) below:

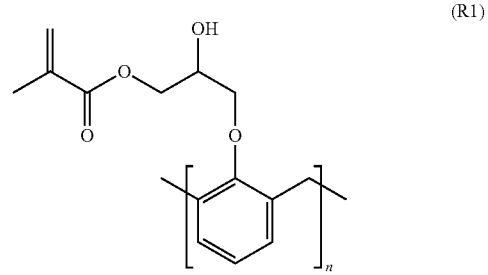

An epoxy vinyl ester resin based on bisphenol A, the "A" recalling that the product is manufactured using acetone, corresponds for example to formula (R2) below:

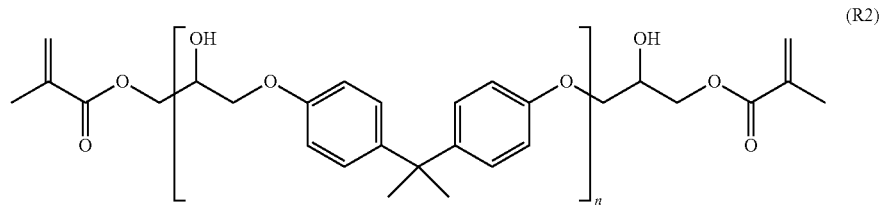

An epoxy vinyl ester resin of novolac and bisphenol type has shown excellent results. By way of example of such a resin, mention may notably be made of the vinyl ester resins "Atlac 590" and "E-Nova FW 2045" from the company Aliancys (diluted with approximately 40% styrene by weight) described for example in patent applications EP-A-1 074 369 and EP-A-1 174 250. Epoxy vinyl ester resins are available from other manufacturers, for instance AOC (USA-"Vipel" resins).

Crosslinking Initiator

The resin composition according to the invention comprises a crosslinking initiator.

In a particular arrangement of the invention, the crosslinking initiator is a radical initiator selected from halogenated compounds, compounds comprising an azo group, and peroxide compounds. Preferably, the crosslinking initiator is a radical initiator selected from azobisisobutyronitrile and peroxides, preferentially selected from azobisisobutyronitrile and benzoyl peroxide.

In another particular arrangement of the invention, the crosslinking initiator is a photoinitiator sensitive (that is to say reactive) to UV above 300 nm, preferably between 300 and 450 nm, preferentially selected from the group of phosphine compounds, alpha-hydroxy ketone compounds, benzophenone compounds, thioxanthone derivatives and a mixture thereof.

Preferably, this photoinitiator is of the family of the phosphine compounds, more preferably a bis(acyl)phosphine oxide, such as, for example bis(2,4,6-trimethylbenzoyl)phenylphosphine oxide (Irgacure 819 from BASF for example), or a mono(acyl)phosphine oxide (for example Esacure TPO from Lamberti), it being possible for such phosphine compounds to be used as a mixture with other photoinitiators, for example photoinitiators of alpha-hydroxy ketone type, such as, for example, dimethylhydroxy acetophenone (e.g., Esacure KL200 from Lamberti) or 1-hydroxycyclohexyl phenyl ketone (e.g., Esacure KS300 from Lamberti), benzophenones, such as 2,4,6-trimethylbenzophenone (e.g., Esacure TZT from Lamberti), and/or thioxanthone derivatives, such as, for example, isopropylthioxanthone (e.g., Esacure ITX from Lamberti).

The crosslinking initiator is used at a preferential content of from 0.5% to 3% by weight, more preferentially from 1% to 2.5% by weight of the resin composition according to the invention.

Crosslinking Agent

The resin composition according to the invention comprises a crosslinking agent of general formula (I)

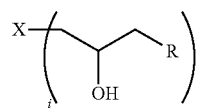

(I)

in which:
- i is an integer between 2 and 4;
- X is an i-valent group comprising at least one ring of 6 atoms selected from carbon and nitrogen and comprising at least 2 heteroatoms selected from nitrogen and oxygen;
- R is an acrylate group, methacrylate group, vinyl group, alkenyl group bearing an unsaturated carbon at the chain end, or alkynyl group bearing an unsaturated carbon at the chain end.

X is therefore an i-valent group attached to which are i groups of general formula ($-CH_2-CHOH-CH_2-R$), the R group being as defined above.

Preferably, the i groups of the crosslinking agent are each bonded to the X group through a heteroatom of said X group.

Preferably, the X group comprises at least one aromatic ring.

Preferably, the X group is an i-valent group having as formula one of the formulae (II) to (IV) below:

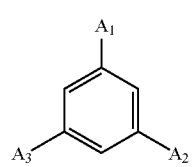

(II)

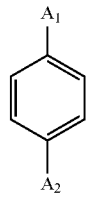

(III)

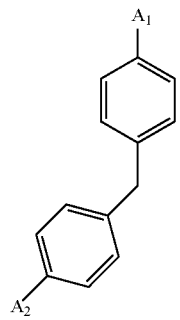

(IV)

in which the $A_1$, $A_2$ and $A_3$ groups each represent, independently of one another, an at least divalent group comprising a heteroatom selected from oxygen and nitrogen.

Preferably, A represents a heteroatom selected from oxygen and nitrogen.

In a particular arrangement, the X group is a trivalent group of formula (V):

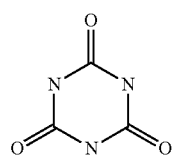

(V)

Preferably, R is an acrylate, methacrylate, vinyl, allyl or ethynyl group, preferentially an acrylate, methacrylate or vinyl group, and very preferentially an acrylate or methacrylate group.

The crosslinking agent is used at a preferential content of between 2% and 15% by weight, preferably between 5% and 10% by weight of the resin composition according to the invention.

The invention also relates to a compound, or crosslinking agent, of formula (VI), which can be used in a resin composition, corresponding to the compound of general formula (I) in which i is equal to 4, X is a group of formula (III), A represents the nitrogen atom, and R is an acrylate group:

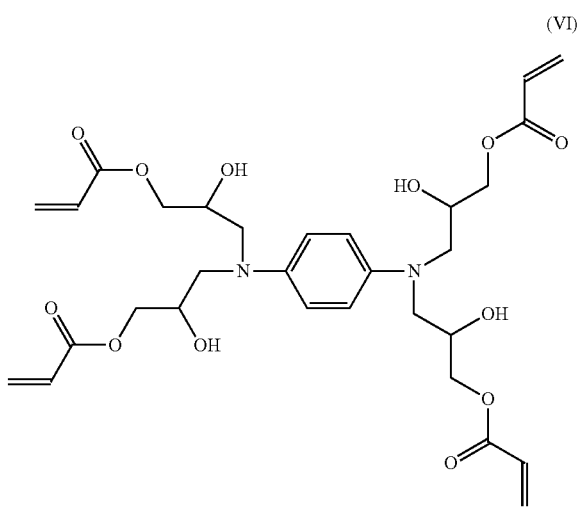

(VI)

The invention also relates to a compound, or crosslinking agent, of formula (VII), which can be used in a resin composition, corresponding to the compound of general formula (I) in which i is equal to 3, X is a group of formula (V), A represents the nitrogen atom, and R is an acrylate group:

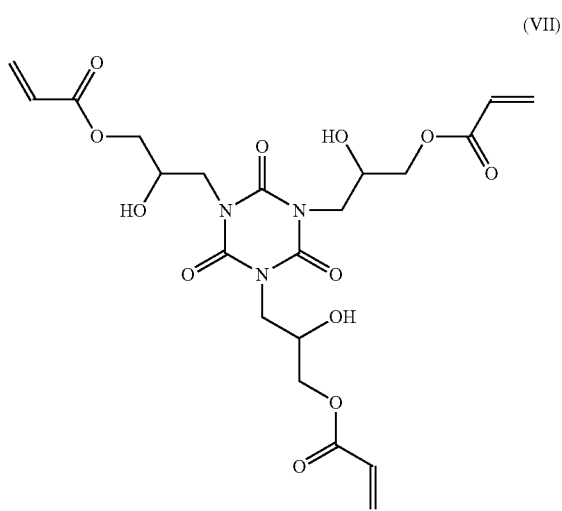

(VII)

Very preferably, the crosslinking agent of general formula (I) is selected from the trivinyl ester trisisocyanurate, phenylenediamine tetravinyl ester acrylate, phloroglucinol trivinyl ester acrylate and para-aminophenol trivinyl ester acrylate.

The crosslinking agent can be prepared in any manner known to those skilled in the art. For example, it is possible to react a compound $XH_i$, where X represents an i-valent group as defined above, with an epoxide compound such as epichlorohydrin under appropriate conditions, for example in the presence of a catalyst such as tetraethylammonium bromide (TEAB), in order to obtain a glycidyl product comprising i epoxide functions.

The glycidyl product is then placed in the presence of a compound comprising an R group as defined above and capable of reacting with the glycidyl product under appropriate conditions, for example acrylic acid in the presence of hydroquinone and triphenylphosphine, so as to obtain the crosslinking agent of general formula (I).

Those skilled in the art will adjust the compounds and the reaction conditions as a function of the crosslinking agent that they seek to obtain.

Surprisingly, the crosslinking agent of general formula (I) makes it possible to obtain resin compositions that have excellent characteristics in terms of elongation at break and flexural modulus.

Composite

A further subject of the invention is a composite based on at least one fibre and on the resin composition according to the invention.

A fibre is understood to mean an element exhibiting a length at least 10 times greater than the greatest dimension of its section, irrespective of the shape of the latter: circular, elliptical, oblong, polygonal, in particular rectangular or square or oval. In the case of a rectangular section, the fibre has the shape of a strip.

Preferably, the fibre is made of a material selected from organic and inorganic materials, in particular from metallic and textile materials. Very preferably, the fibre is made of a material selected from aliphatic polyamides, polyesters, aromatic polyamides, natural cellulose, rayon, glass, quartz, basalt, carbon, and a metal selected from the group consisting of steel, copper, zinc, brass and alloys of these metals.

A metallic fibre may be a metallic elementary monofilament. Such a metallic elementary monofilament comprises a steel core, optionally coated with one or more layers of a coating which may comprise a metal selected from zinc, copper, tin, cobalt and alloys of these metals.

A metallic fibre may be an assembly of several metallic elementary monofilaments as described above, assembled together in a helix, for example by braiding or twisting the metallic elementary monofilaments in order to form, for example, layered cords comprising several concentric layers of metallic elementary monofilaments, or strand cords, each strand comprising several concentric layers of metallic elementary monofilaments.

A textile fibre may be a textile elementary monofilament. This textile elementary monofilament is obtained, for example, by melt spinning, solution spinning or gel spinning. Each textile elementary monofilament is made from an organic material, especially polymeric material, or inorganic material, such as, for example, glass, quartz, basalt or carbon. The polymeric materials may be of the thermoplastic type, for example aliphatic polyamides, in particular polyamides 6,6, and polyesters, in particular polyethylene terephthalate. The polymeric materials can be of the non-thermoplastic type, such as, for example, aromatic polyamides, in particular aramid, and cellulose, either natural or synthetic, in particular rayon. Each textile elementary monofilament exhibits a substantially circular section exhibiting a diameter ranging, for example, from 2 µm to 100 µm.

A textile fibre may be an assembly of several textile elementary monofilaments as defined above, also referred to as ply. A ply preferably comprises more than 10 textile elementary monofilaments, preferably more than 100 textile elementary monofilaments and more preferentially more than 500 textile elementary monofilaments.

A textile fibre may also be an assembly of several plies as defined above.

Said textile fibre is preferentially of polyester, polyamide, glass, carbon, quartz or basalt type. Very preferably, the fibre is of glass type and the composite according to the invention is a glass-resin composite (GRC).

Said textile fibre is preferentially coated with one or more layers of a bonding agent, commonly referred to as size, which is suitable for the resin composition according to the invention.

In one preferred arrangement, the composite comprises a plurality of fibres arranged side by side in a main direction, the fibres being substantially parallel to one another.

In another preferred arrangement, the composite comprises a plurality of fibres assembled as knitted fabric or as woven fabrics.

A knitted fabric is an assembly of fibres as defined above and comprising stitches formed by one or more of these fibres. Each stitch comprises a loop interlaced with another loop. Mention may be made, for example, of knitted fabrics with a jersey or English rib structure for weft-knitted fabrics and knitted fabrics with a locknit or atlas structure for warp-knitted fabrics.

A woven fabric is an assembly of a first family of fibres, known as warp fibres, substantially parallel to one another, and of a second family of fibres, known as weft fibres, substantially parallel to one another. Preferably, the fibres of the first family are substantially perpendicular to the fibres of the second family.

The composite in accordance with the invention may be noncrosslinked, partially crosslinked, or crosslinked. The composite is crosslinked after bringing said at least one fibre into contact with the resin composition according to the invention.

The composite according to the invention can very particularly be used as a reinforcing element in crown reinforcements (or belts) or in carcass reinforcements of pneumatic tyres, as described in particular in documents EP 1 167 080 (or U.S. Pat. No. 7,032,637) and WO 2012/115615.

The composite according to the invention can also be used, due to its low density and its improved elongation at break and flexural modulus properties, as a reinforcing element in tyres or flexible wheels of non-pneumatic type, that is to say which are structurally supported (without internal pressure). Such tyres are well known to those skilled in the art (see for example EP 1 242 254 or U.S. Pat. No. 6,769,465, EP 1 359 028 or U.S. Pat. No. 6,994,135, EP 1 242 254 or U.S. Pat. Nos. 6,769,465, 7,201,194, WO 00/37269 or U.S. Pat. No. 6,640,859, WO 2007/085414, WO 2008/080535, WO 2009/033620, WO 2009/135561, WO 2012/032000); when it is combined with any rigid mechanical element intended to create the link between the flexible tyre and the hub of a wheel, it replaces the assembly made up of the pneumatic tyre, the wheel rim and the disc as they are known in the majority of contemporary road vehicles.

The composite according to the invention can particularly be used as an essentially inextensible reinforcing element of the membranes used in the annular band (or shear band) of a non-pneumatic tyre as described for example in patent U.S. Pat. No. 7,201,194, such a tyre having the feature of including an annular band that supports the load on the tyre and a plurality of support elements or spokes, having very low stiffness in compression, which operate in tension to transmit the forces between the annular band and the wheel hub.

Finished or Semi-Finished Article

A further subject of the invention is a finished or semi-finished article comprising a composite according to the invention or a composition according to the invention coated with a rubber composition matrix or a compound, or cross-linking agent, of formula (VI) or (VII).

Said rubber composition matrix is based on at least one diene or non-diene (for example thermoplastic) elastomer. It is preferably a composition of the crosslinked or crosslinkable type, which is to say that it then comprises a crosslinking system (notably a vulcanizing system) suitable for allowing the composition to crosslink (harden) as it is being cured (or as the rubber item such as a tyre is being cured).

For preference, the elastomer is a diene elastomer. As is known, diene elastomers can be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come under the above definition and can especially be described as "essentially saturated" diene elastomers (low or very low content of units of diene origin, always less than 15%). In the category of "essentially unsaturated" diene elastomers, a "highly unsaturated" diene elastomer in particular refers to a diene elastomer having a content of units of diene origin (conjugated dienes) which is greater than 50%.

Although it is applicable to any type of diene elastomer, the present invention is preferentially carried out with a diene elastomer of the highly unsaturated type.

This diene elastomer is more preferably selected from the group consisting of polybutadienes (BRs), natural rubber (NR), synthetic polyisoprenes (IRs), butadiene copolymers, isoprene copolymers and mixtures of these elastomers, such copolymers being notably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

The rubber composition may contain a single diene elastomer or several diene elastomers, the latter possibly being used in combination with any type of synthetic elastomer other than a diene elastomer, or even with polymers other than elastomers. The rubber composition can also comprise all or some of the additives known to those skilled in the art and normally used in rubber compositions intended for the manufacture of tyres, such as, for example, reinforcing fillers, such as carbon black or silica, coupling agents, non-reinforcing fillers, plasticizers (plasticizing oils and/or plasticizing resins), pigments, protective agents, such as antiozone waxes, chemical antiozonants, antioxidants or anti-fatigue agents, a crosslinking system, for example based on sulfur and other vulcanizing agents and/or on peroxide and/or on bismaleimide.

Owing to the invention, compared to rubber compositions reinforced with steel cords, the rubber composition matrix of the finished or semi-finished article according to the invention may advantageously be devoid of metal salt such as a cobalt salt. The adhesion between the composite of the invention and the layer of rubber composition which coats it may be provided in a simple and known manner, for example by a standard adhesive of RFL (resorcinol-formaldehyde-latex) type, or with the aid of more recent adhesives as described for example in patent applications WO 2013/017421, WO 2013/017422, WO 2013/017423.

Tyre

A further subject of the invention is a tyre comprising a composite, a composition, or a finished or semi-finished article according to the invention.

The composite of the invention can be used for reinforcing pneumatic or non-pneumatic tyres of all types of vehicles, in particular passenger vehicles or industrial vehicles such as heavy-duty vehicles, civil engineering machines, aircraft and other transport or handling vehicles.

FIG. 1 As an example, FIG. 1 illustrates, highly schematically (without being true to a specific scale) a radial section through a pneumatic tyre, that is or is not in accordance with the invention in this general representation.

This pneumatic tyre 200 comprises a crown 202 reinforced by a crown reinforcement or belt 206, two sidewalls 203 and two beads 204, each of these beads 204 being reinforced with a bead wire 205. The crown 202 is surmounted by a tread, not represented in this diagrammatic figure. A carcass reinforcement 207 is wound around the two bead wires 205 in each bead 204, the turn-up 208 of this reinforcement 207 being, for example, positioned towards the outside of the tyre 200, which is represented here fitted onto its wheel rim 209. Of course, this pneumatic tyre 200 additionally comprises, in a known way, a layer of rubber 201 commonly referred to as an airtight rubber or layer, which defines the radially inner face of the tyre and which is intended to protect the carcass ply from the diffusion of air originating from the space interior to the pneumatic tyre.

The carcass reinforcement 207, in the tyres of the prior art, is generally formed from at least one rubber ply reinforced by what are referred to as "radial" textile or metal reinforcers, that is to say these reinforcers are arranged practically parallel to one another and extend from one bead to the other to form an angle of between 80° and 90° with the median circumferential plane (plane perpendicular to the axis of rotation of the tyre, which is situated halfway between the two beads 204 and passes through the middle of the crown reinforcement 206).

The belt 206 is for example formed, in the tyres of the prior art, of at least two superposed and crossed rubber plies known as "working plies" or "triangulation plies", reinforced with metal cords positioned substantially parallel to one another and inclined relative to the median circumferential plane, it being possible for these working plies to optionally be combined with other rubber fabrics and/or plies. The primary role of these working plies is to give the pneumatic tyre a high cornering stiffness. The belt 206 may further comprise in this example a rubber ply, referred to as a "hooping ply", reinforced with reinforcing threads referred to as "circumferential" reinforcing threads, that is to say that these reinforcing threads are positioned virtually parallel to each other and extend substantially circumferentially around the pneumatic tyre so as to form an angle preferentially within a range from 0° to 10° with the median circumferential plane. The function of these circumferential reinforcing threads is notably to withstand the centrifugation of the crown at high speed.

A pneumatic tyre 200, when it is in accordance with the invention, has the preferential feature that at least its belt (206) and/or its carcass reinforcement (207) comprises a composite according to the invention, positioned between and in contact with two layers of rubber composition. According to one particular embodiment of the invention, the composite of the invention may be used in the form of parallel sections positioned under the tread, as described in the patent EP 1 167 080. According to another possible exemplary embodiment of the invention, it is the bead zone that may be reinforced with such a multicomposite reinforcer; it is for example the bead wires (205) that could be formed, in whole or in part, of a multicomposite reinforcer according to the invention.

Method

The resin compositions according to the invention are produced as follows: the resin is introduced into a stirred tank heated to a temperature between 60° C. and 100° C. The temperature at which the tank is maintained depends on the crosslinking agent selected and enables the complete solubilization thereof. The crosslinking agent is gradually added until completely solubilized. The crosslinking initiator is then added, in the absence of light, while maintaining the temperature of the assembly. Stirring is maintained until complete solubilization of all the species.

The composites in accordance with the invention can be prepared according to a process comprising the following main steps:

creating a rectilinear arrangement of fibres and conveying this arrangement in a feed direction;

in a vacuum chamber, degassing the arrangement of fibres by the action of the vacuum;

at the outlet of the vacuum chamber, after degassing, passing through a vacuum impregnation chamber so as to impregnate said arrangement of fibres with the resin composition according to the invention, in the liquid state, in order to obtain a prepreg containing the fibres and the resin composition;

in a UV irradiation chamber, polymerizing the resin under the action of the UV rays;

then winding the composite thus obtained, for storage.

All the above steps (arranging, degassing, impregnating, polymerizing and final winding) are steps which are known to those skilled in the art; they have been described, for example, in the applications EP-A-1 074 369 and EP-A-1 174 250.

A heat treatment (curing) step can be carried out before winding for storage so as to complete, where necessary, the crosslinking of the composite. This step can be carried out in conjunction with a pressurization of the composite, in particular when several composites are assembled to form a laminate.

It will be recalled notably that before any impregnation of the fibres, an essential step of degassing the arrangement of fibres by the action of the vacuum must be carried out, in order notably to boost the effectiveness of the subsequent impregnation, and above all to guarantee the absence of bubbles within the final composite.

After passing through the vacuum chamber, the fibres enter an impregnation chamber which is completely full of impregnation resin and thus devoid of air: it is in this sense that this impregnation step can be termed "vacuum impregnation".

The polymerization or UV irradiation chamber subsequently has the role of polymerizing or crosslinking the resin under the action of the UV radiation. It includes one or preferably several UV irradiators, each composed, for example, of a UV lamp with a wavelength of from 200 to 600 nm, preferentially from 300 to 600 nm and more preferentially from 300 to 450 nm.

The composite thus formed through the UV irradiation chamber, in which the resin is now in the solid state, is then recovered for example on a take-up reel, on which it may be wound over a very great length.

Measurement Methods

The mechanical properties of flexural modulus and elongation at break are measured in a known manner using an "INSTRON" type 4466 tensile testing machine (BLUEHILL-2 software supplied with the tensile testing machine), according to the ISO 14125:1998-06 standard with the following modifications: the thickness of the test specimen is 2 mm instead of the 4 mm set by the standard, and the flexural modulus is determined at 0.75% strain instead of 0.05% strain set in the standard. The measurements are carried out on multicomposite reinforcers as manufactured, that is to say which have not been sized, or else sized (that is to say ready to use), or else extracted from the semi-finished product or from the article made of rubber that they reinforce. Before measurement, these multicomposite reinforcers are subjected to prior conditioning (storage for at least 24 hours in a standard atmosphere in accordance with European Standard DIN EN 20139 (temperature of 23±2° C.; relative humidity of 50±5%). All the results given are an average over 10 measurements.

The examples that follow illustrate the invention without limiting it.

EXAMPLES

Preparation of the Compositions

The process for preparing each composition listed in Table 1 is as follows: the resin is introduced into a tank equipped with a magnetic stirrer and the temperature of which is maintained at 80° C. The additive is gradually added until completely solubilized. The crosslinking initiator is then added, in the absence of light, while maintaining the temperature of the assembly at 80° C. Stirring is maintained until complete solubilization of all the species.

The control composition T1 comprises only the "Atlac 590" vinyl ester acrylate resin and an "Irgacure 819" photoinitiator. The control composition T2, in accordance with the teaching of document FR 3,031,757 further comprises a crosslinking agent, tris(2-hydroxyethyl)isocyanurate triacrylate ("SR 368" from the company Sartomer).

TABLE 1

| | Compositions in wt % | | | | | | |
|---|---|---|---|---|---|---|---|
| | T1 | T2 | C1 | C2 | C3 | C4 | C5 |
| Vinyl ester acrylate resin (1) | 98.5 | 83.5 | 81.5 | 89.7 | 88.6 | 91.6 | 92.0 |
| Photoinitiator (2) | 1.5 | 1.5 | 1.5 | 1.5 | 1.5 | 1.5 | 1.5 |
| Crosslinking agent 1 (3) | — | 15.0 | — | — | — | — | — |
| Crosslinking agent 2 (4) | — | — | 17.0 | 8.9 | — | — | — |
| Crosslinking agent 3 (5) | — | — | — | — | 9.9 | — | — |
| Crosslinking agent 4 (6) | — | — | — | — | — | 7.0 | — |
| Crosslinking agent 5 (7) | — | — | — | — | — | — | 6.5 |
| Molar equivalent of acrylate crosslinking agent functions/ acrylate resin functions | — | 0.30 | 0.30 | 0.14 | 0.14 | 0.09 | 0.09 |

(1) "Atlac 590" supplied by the company Aliancys
(2) "Irgacure 819" supplied by the company BASF
(3) "SR 368" tris(2-hydroxyethyl)isocyanurate triacrylate from the company Sartomer
(4) para-aminophenol trivinyl ester acrylate (CAS 159920-31-7)
(5) trivinyl ester trisisocyanurate
(6) phloroglucinol trivinyl ester acrylate (CAS 1803826-18-7)
(7) phenylenediamine tetravinyl ester acrylate The crosslinking agents (4) to (7) are synthesized as follows: a compound $XH_i$ selected from the compounds phloroglucinol, 4-aminophenol, isocyanuric acid and p-phenylenediamine are epoxidized with epichlorohydrin in the presence of tetraethylammonium bromide.

The glycidyl product obtained then reacts with acrylic acid in the presence of hydroquinone and triphenylphosphine in order to form the crosslinking agent.

Preparation of the Test Specimens

A sample of glass fabric with a 2/2 twill weave and a basis weight of 300 g/m² (for example the 300 g/m² 2/2 twill glass fabric, reference 3300, from the company Sicomin) is impregnated at a temperature of 80° C. with the composition to be tested. The size of this sample is 20×30 cm. Each face of the impregnated fabric is covered with a mylar (PET) film.

A "pre-composite" is produced by carrying out a simultaneous first photopolymerization of the two faces of the impregnated fabric by exposure for the number of seconds indicated in Table II under ultraviolet radiation (average wavelength of 365 nm) emitted by a set of tubes with a total power of 800 W placed at a distance of 18 cm on either side of the pre-composite. The thickness of the pre-composite is approximately 0.3 mm. The exposure time is adjusted by trial and error so as to obtain a pre-composite that is rigid enough to be able to be handled and cut, but that retains enough "tack" and malleability so that the plates can stay assembled after being brought into contact and so that the air bubbles can escape. The pre-composite comprises 60% by weight of fibres and 40% by weight of resin composition (plus or minus 1%).

TABLE 2

| | UV exposure time (seconds) |
|---|---|
| T1 | 20 |
| T2 | 20 |
| C1 | 24 |
| C2 | 24 |
| C3 | 12 |
| C4 | 12 |
| C5 | 40 |

Photopolymerization Time as a Function of the Composition

The pre-composite is then cut into 12 plates of 45×80 mm. Six pre-composite plates are stacked after having removed the protective mylar film, making sure they are aligned, i.e. that the warp yarns of the fabric of each plate are parallel to the warp yarns of the fabrics of the adjacent plates.

The stack is placed in a heating press set to 200° C., under a pressure of 30 MPa for 15 minutes in order to obtain the crosslinked test specimen.

The crosslinked test specimen is cut into test specimens with dimensions of 80×15 mm in order to carry out the measurements, the results of which are presented below.

The test specimens are used for measuring the elongation at break and flexural modulus properties.

The results of measurements are indicated in Table 3.

TABLE 3

| | T1 | T2 | C1 | C2 | C3 | C4 | C5 |
|---|---|---|---|---|---|---|---|
| Elongation at break (%) | 100 | 92 | 113 | 110 | 112 | 105 | 119 |
| Flexural modulus at 0.75% (MPa) | 100 | 107 | 94 | 108 | 110 | 119 | 116 |

Results of the Flexural Modulus and Elongation at Break Measurements

It is observed that the composites in accordance with the invention exhibit an improvement in the elongation at break, both compared to the control T1 and compared to the control T2. By reducing the content of crosslinking agent in terms of molar equivalent, both the elongation at break and the flexural modulus are improved.

The invention claimed is:

1. A pneumatic tire comprising: a crown reinforced by a crown reinforcement; two sidewalls; two beads, each bead being reinforced with a bead wire; and a carcass reinforcement wound around the bead wire in each bead;

wherein the carcass reinforcement, the crown reinforcement, or both comprise a composite; wherein the composite comprises at least one fiber and a resin composition in a crosslinked state; and wherein the resin composition is based on:

a crosslinkable resin selected from the group consisting of vinyl ester resins and unsaturated polyester resins;

a crosslinking initiator, present in an amount of from 0.5% to 3% by weight of the resin composition; and a crosslinking agent of general formula (I), present in an amount of from 2% and 15% by weight of the resin composition,

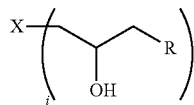

(I)

in which:
i is an integer of 2 to 4,

X is an i-valent group comprising at least one ring of 6 atoms selected from carbon and nitrogen and comprising at least 2 heteroatoms selected from nitrogen and oxygen, and R is an acrylate group, methacrylate group, vinyl group, alkenyl group bearing an unsaturated carbon at the chain end, or alkynyl group bearing an unsaturated carbon at the chain end.

2. The pneumatic tire according to claim 1, wherein the crosslinkable resin is selected from the group consisting of vinyl ester resins.

3. The pneumatic tire according to claim 2, wherein the crosslinkable resin is an epoxy vinyl ester resin based on novolac, bisphenol, or novolac and bisphenol.

4. The pneumatic tire according to claim 1, wherein the i groups are each bonded to the X group through a heteroatom of the X group.

5. The pneumatic tire according to claim 1, wherein the X group comprises at least one aromatic ring.

6. The pneumatic tire according to claim 5, wherein the X group is an i-valent group having one of the formulae (II) to (IV):

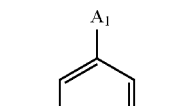

(II)

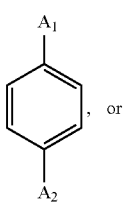

(III)

, or

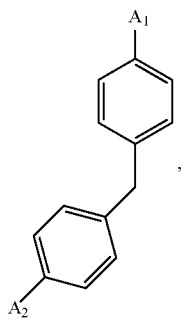

(IV)

in which the $A_1$, $A_2$ and $A_3$ groups each represent, independently of one another, an at least divalent group comprising a heteroatom selected from oxygen and nitrogen.

7. The pneumatic tire according to claim 1, wherein the X group is a trivalent group of formula (V):

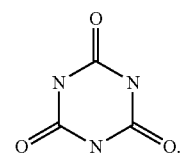

(V)

8. The pneumatic tire according to claim 1, wherein R is an acrylate, methacrylate, vinyl, allyl or ethynyl group.

9. The pneumatic tire according to claim 1, wherein the crosslinking initiator is a radical initiator selected from the group consisting of halogenated compounds, compounds comprising an azo group, and peroxide compounds.

10. The pneumatic tire according to claim 1, wherein the crosslinking initiator is a photoinitiator sensitive to UV above 300 nm.

11. The pneumatic tire according to claim 1, wherein the crosslinking agent is a compound of formula (VI) or (VII):

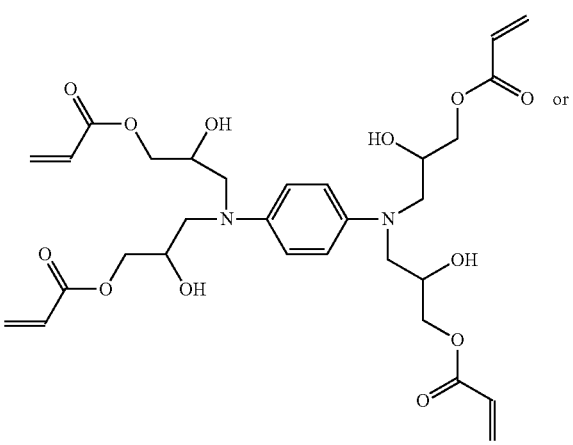

(VI) or

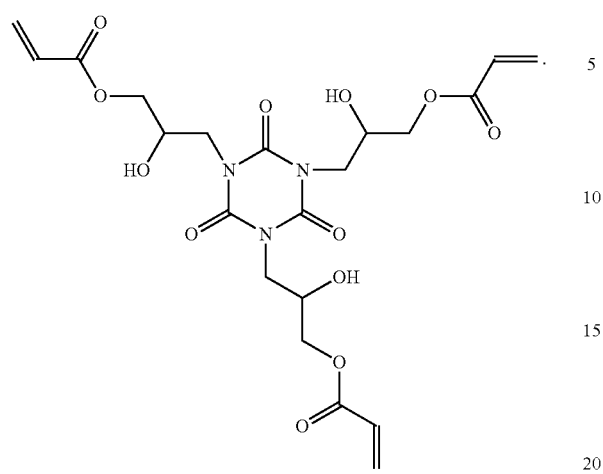
(VII)